United States Patent [19]

Steenblik et al.

[11] Patent Number: 5,475,533
[45] Date of Patent: Dec. 12, 1995

[54] APPARATUS FOR ENHANCING THE BRIGHTNESS OF AN IMAGE AND METHOD OF MAKING THE SAME

[75] Inventors: Richard A. Steenblik, Atlanta; Mark J. Hurt, Alpharetta; Samuel D. Shearman, Atlanta, all of Ga.

[73] Assignee: Applied Physics Research, L.P., Roswell, Ga.

[21] Appl. No.: 101,560

[22] Filed: Aug. 2, 1993

[51] Int. Cl.⁶ .................................... G02B 27/10
[52] U.S. Cl. .................. 359/628; 359/455; 359/459; 359/623; 359/624; 359/625; 359/626; 359/627
[58] Field of Search .................... 359/454, 455, 359/459, 542, 619, 620, 621, 622, 623, 624, 625, 626, 627, 628

[56] References Cited

U.S. PATENT DOCUMENTS

| | | | |
|---|---|---|---|
| 3,005,382 | 10/1961 | Weber | 88/82 |
| 3,887,742 | 6/1975 | Reinnagel | 428/211 |
| 3,894,228 | 7/1975 | Cobb, Jr. | 240/46.31 |
| 4,013,465 | 3/1977 | Clapham et al. | |
| 4,118,119 | 10/1978 | Maiorano | 355/11 |
| 4,124,947 | 11/1978 | Kuhl et al. | 40/453 |
| 4,141,731 | 2/1979 | Jarsen | 96/35.1 |
| 4,184,700 | 1/1980 | Greenaway | |
| 4,406,045 | 9/1983 | Schwab | 29/527 |
| 4,519,686 | 5/1985 | Seki et al. | 359/454 |
| 4,576,850 | 3/1986 | Martens | 428/156 |
| 4,706,173 | 11/1987 | Hamada et al. | 362/341 |
| 5,004,673 | 4/1991 | Vlannes | 430/325 |
| 5,119,235 | 6/1992 | Umeda et al. | 359/619 |
| 5,128,787 | 7/1992 | Blonder | 359/70 |
| 5,177,637 | 1/1993 | Tsukada | 359/619 |

FOREIGN PATENT DOCUMENTS 63-8039  7/1989  Japan .................. G03B 13/24

OTHER PUBLICATIONS

F. J. Bealle and A. Rosen, Anti–Copy Paper; pp. 2319–2320, vol. 26 No. 5, Oct. 1983, IBM Technical Disclosure Bulletin.

*Primary Examiner*—Georgia Y. Epps
*Assistant Examiner*—Thomas Robbins
*Attorney, Agent, or Firm*—Deveau, Colton & Marquis

[57] ABSTRACT

A light control material generally comprising a transparent substrate for carrying a print or photographic image and a plurality of focusing elements which provide a field of view over which the brightness of the print or photographic image is enhanced. The field of view is controlled by the geometry of the focusing elements including radius, width, and degree of symmetry. By providing a field of view over which the brightness of the image is enhanced, the image may be viewed at angles which avoid the angles of specular reflection, which are usually seen as unwanted glare. Furthermore, selected portions of an image may be brightness enhanced more than others or selected portions may be brightness enhanced while others are not.

31 Claims, 4 Drawing Sheets

APPARATUS FOR ENHANCING THE BRIGHTNESS OF AN IMAGE AND METHOD OF MAKING THE SAME

TECHNICAL FIELD

The present invention generally relates to a light control material which enhances the brightness of an image in contact or in proximity therewith and more particularly, to a light control material which includes a plurality of small reflectors which reflect light through a predetermined range of viewing angles, thereby enhancing the brightness of the image while reducing the effects of glare.

BACKGROUND OF THE INVENTION

The concept of utilizing a reflector to receive light impinging on the reflector and to reflect the light in a predetermined manner is well known. For example, U.S. Pat. No. 4,406,045 discloses a warning reflector having toroidal reflective surfaces which reflect a small angular region of incident light into a broad output region to warn nearby animals of an approaching vehicle. U.S. Pat. No. 3,005,382 discloses a reflex-reflecting sheet material which is intended to transmit a certain proportion of light impinging on one surface of the material and to reflect a large proportion of light impinging on another surface of the material back to its source. None of these references teaches a device utilizing a plurality of light focusing elements for enhancing the brightness of a print of photographic image while reducing the effects of glare.

U.S. Pat. No. 5,128,787 discloses providing a liquid crystal display with a back reflector having a plurality of planar reflecting facets angularly displaced with respect to the plane of the display to receive light coming from above a viewer and from over the shoulders of the viewer and to redirect reflection of the light toward the viewer in order to enhance the contrast of the display and to reduce glare. The planar reflecting facets redirect light from the source without changing the angular extent of the light. The field of view provided by the planar reflecting facts is strictly determined by the angular extent of the light source. The planar reflecting facets provide multiple viewing positions but do not affect or control the field of view at each position. Therefore, there may be positions between the provided viewing positions at which there is no light reflected to the observer, depending on the angular extent of the source.

The present invention "re-images" the source by means of focusing elements which provide a minimum field of view. The minimum field of view is determined by the geometry of the focusing elements and is independent of the angular extent of the light source. Therefore, geometries can be selected such that a minimum field of view can be provided over which the brightness of an image is enhanced and which is independent of the angular extent of the light source.

U.S. Pat. No. 4,706,173 discloses a lighting apparatus for use in a liquid crystal display which utilizes a back light in conjunction with a plurality of reflective planar surfaces which are angularly oriented to reflect light in a predetermined direction along a viewing angle.

Although the idea of controlling reflection has been implemented in various technological environments, as discussed above, a need exists for a light control material which is capable of providing a minimum field of view which is independent of the angular extent of the light source thereby "re-imaging" the light source for enhancing the brightness of an image.

SUMMARY OF THE INVENTION

The present invention is directed to a light control device which enhances the brightness of an image independent of the angular extent of the light source illuminating the image. The light control device is comprised of a plurality of micro-optic focusing elements on which the image is placed. The focusing elements of the present invention have geometries which are curved in at least one dimension and which are selected to provide a particular minimum field of view. The focusing elements "re-image" the light source, i.e., they provide a minimum field of view which is independent of the angular extent of the light source. The overall field of view provided by a particular focusing element is dependent upon the geometry of that focusing element and the angular extent of the light source. By controlling the minimum field of view of the focusing elements, the overall field of view (hereinafter field of view) of an image can be controlled. This allows light to be reflected and concentrated through a range of viewing angles which in turn allows the brightness of an image to be enhanced through the range of viewing angles. The present invention also provides means for reducing the effect of specular reflection which is often seen as glare. When symmetrical focusing elements are used, light from the focusing elements is centered about the specular reflection thereby providing angles on either side of the angles of specular reflection from which the image can be viewed while avoiding the specular reflection. When asymmetrical focusing elements are used, a field of view can be provided which does not include the angles of specular reflection, thereby allowing the angles of specular reflection to be avoided. When symmetrical focusing elements having narrow fields of view are provided, the light coming from the focusing elements is concentrated such that it overpowers the specular reflection, which is typically on the order of 4% of incident light.

In the preferred embodiment, the present invention generally relates to a light control material comprising a transparent substrate suitable for carrying a print or photographic image and a plurality of focusing elements. The focusing elements control light such that there is a range of viewing angles over which the print or photographic image will have enhanced brightness. The range of viewing angles is controlled by the geometry of the focusing elements, including radius, width, and degree of symmetry. The focusing elements are curved in at least one dimension and may be either convex or concave in shape and are preferably concave with respect to the print or photographic image. By enhancing the brightness of the image over a particular range of viewing angles, or field of view, bright illuminations coming from the focusing elements and passing through the print or photographic image allow the image to be viewed from angles different from the angles of specular reflection, thereby avoiding the specular reflection viewing directions which are usually seen as unwanted glare. By providing symmetrical focusing elements having narrow fields of view, light from the focusing elements can be concentrated such that specular reflection, which is typically about 4% of the incident light, can be overpowered. Furthermore, light reflected from the focusing elements may be concentrated into a smaller solid angle or wedge than light reflected from a diffuse surface. Therefore, the light intensity within this solid viewing angle is greater than that resulting from diffuse reflection.

Accordingly, it is an object of the present invention to provide a light control material which is capable of enhancing the brightness of a print or photographic image by controlling the field of view of the image.

It is another object of the present invention to provide a light control material having focusing elements which provide a minimum field of view which is independent of the angular extent of the light source.

It is also an object of the present invention to provide a light control material comprising a plurality of small focusing elements whose geometries are selected to provide a predetermined range of viewing angles.

It is another object of the present invention to provide a light control material which enhances the brightness of an image while reducing the effects of glare.

It is yet another object of the present invention to provide a method for creating a light control material and for generating embossments therefrom.

It is still another object of the present invention to provide a light control material which may be designed to selectively enhance the brightness of certain portions of an image.

It is still another object of the present invention to provide a light control material which enhances the brightness of an image while reducing or eliminating diffractive effects.

It is a further object of the present invention to provide a light control material which is capable of operating in a reflective or transmissive mode.

Other objects and advantages of the present invention will become apparent from the detailed description of the invention given below.

DETAILED DESCRIPTION OF THE INVENTION

Figure 1:
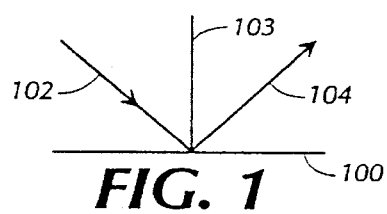
FIG. 1 illustrates specular reflection from the surface of a mirror.
Figure 2:
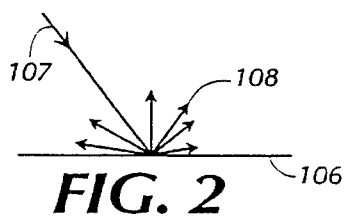
FIG. 2 illustrates diffuse reflection from the surface of a diffuse reflector.

A normal specular surface, such as mirror 100 shown in FIG. 1, reflects light at an angle equal to the angle of incidence. Therefore, the surface of mirror 100 will only look bright when viewed along a line parallel to ray 104. As shown in FIG. 2, a diffuse surface, such as paper 106, receives light 107 incident upon its surface and reflects the light in all directions 108.

The light control material of the present invention provides a field of view over which the brightness of an image is enhanced and over which the image can be viewed from angles which avoid the angles of specular reflection. Furthermore, the light control material of the present invention increases the contrast of the image while enhancing the brightness of the image. When symmetrical focusing elements are provided, light from the focusing elements is centered about the angles of specular reflection. Therefore, an image being brightness enhanced can be viewed from angles on either side of the specular reflection, thereby avoiding glare. Asymmetrical focusing elements allow fields of view to be provided which do not include the angles of specular reflection. This allows an image being brightness enhanced to be viewed through a range of viewing angles which does not include any specular reflection. If symmetrical focusing elements are provided with a narrow field of view, light from the focusing elements can be concentrated such that it overpowers glare. Furthermore, the field of view can be made narrower than the angular range of diffuse reflection from a diffuse surface so that the light intensity within the field of view is greater than that resulting from diffuse reflection.

In the preferred embodiment of the present invention, the light control material operates in a reflective mode. When operating in the reflective mode, the focusing elements are coated with a thin layer of metal and light passes through a transparent substrate before impinging on the surface of the focusing elements. When operating in the transmissive mode, the focusing elements are not coated with a reflective layer. In the transmissive mode, light impinges on the focusing elements first and then passes through the transparent substrate. In both the reflective and transmissive modes, the focusing elements control the field of view of an image and enhance the brightness of the image over the field of view. Since the reflective mode is preferred, the invention will henceforth be described with respect to the reflective mode and the focusing elements will often be referred to as reflectors. However, it will be apparent to those skilled in the art that reflective and transmissive focusing elements which have the same ratio of focal length to diameter also have the same focusing characteristics, i.e., the field of view provided will be the same.

When operating in the reflective mode, the focusing elements may be viewed either as a first surface, in which the light impinges on the reflectors without first passing through the substrate, or as a second surface, in which the light passes through the substrate before impinging on the focusing elements. In other words, the focusing elements may carry the print or photographic image directly thereon (as discussed in detail below) such that the focusing elements act as a first surface and therefore the light control material functions without a substrate. If the image is carried on a substrate, the focusing elements act as a second surface because light passes through the substrate first and before reaching and being reflected by the focusing elements. For most applications the focusing elements will be reflectors and they will be employed as a second surface.

Figure 3:
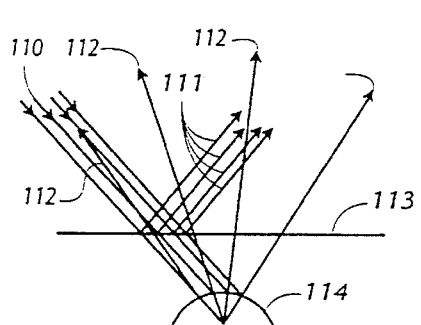
FIG. 3 illustrates the basic concept of the present invention for controlling the field of view.
Figure 4:
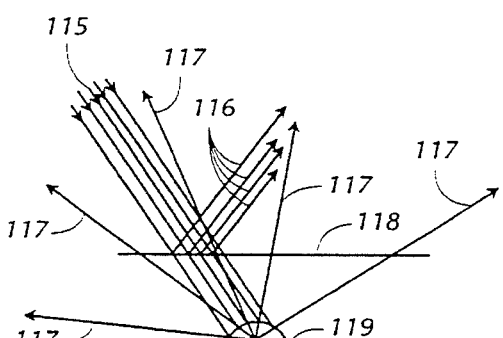
FIG. 4 illustrates how the field of view may be altered in accordance with the present invention by changing the geometry of the focusing elements of the present invention.

FIG. 3 illustrates the basic operation of the present invention wherein convex, symmetrical reflectors 114 are utilized which are below the surface of a transparent substrate 113 and which reflect light 112 through a controlled range of viewing angles. Incident light 110 impinges on the surface 113 and a portion is specularly reflected 111 at angles equal to the angle of incidence. Incident light 110 which passes through the surface of transparent substrate 113 impinges on reflector 114. FIG. 3 depicts one embodiment of the present invention in which the convex reflector is a cylindrical shaped reflector having a focal point 109 located a distance equal to one half the radius of curvature of the reflector from the surface of the reflector. As incident light 110 strikes reflector 114, the light reflects along a line which passes through the focal point and which intersects the point at which the ray of light impinges on the surface of the reflector. The reflected light, as denoted by rays 112, is dispersed through a range of directions, called viewing angles. The range of viewing angles, or field of view, from reflector 114 is controlled by its geometry, including its radius, width, and degree of symmetry. FIG. 4 illustrates how reflector 119, having a smaller radius than that of reflector 114, produces a different pattern of reflected light. As incident light 115 impinges on the surface of reflector 119, light 117 is dispersed through a wider range of viewing angles than that shown in FIG. 3. Also, the closer that the proportions of a reflector approach a hemisphere, the wider the range of reflected viewing angles.

Figure 5:
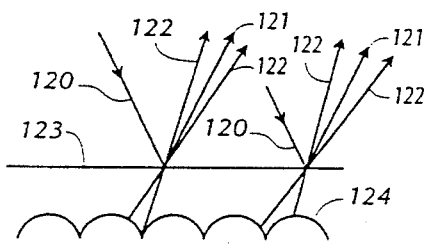
FIG. 5 illustrates how the light control material of the present invention allows specular reflection to be avoided.

FIG. 5 illustrates how the present invention allows the angles of specular reflection to be avoided. Incident rays 120 impinging on surface 123 are specularly reflected 121 at angles which are equal to the angle of incidence. On either side of the specular reflections 121 there are bright illuminations 122 coming from the second surface of the structure. These bright illuminations can be viewed from angles different from the angle of specular reflection, thereby avoiding the specular reflection viewing directions, which are usually seen as unwanted glare.

If the reflectors are used in conjunction with a diffuse surface, such as shown in FIG. 2, light reflected from the surface of the reflectors may be concentrated into a smaller solid angle than light reflected from the diffuse surface, so the light intensity within this range of viewing angles is greater than that resulting from the diffuse reflection.

Figure 6:
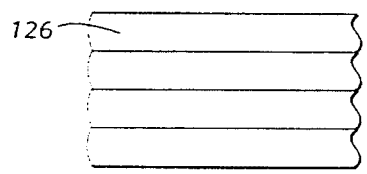
FIG. 6 illustrates a plan view of one embodiment of the focusing elements of the present invention.
Figure 7:
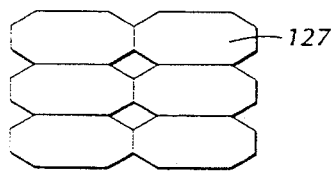
FIG. 7 illustrates a plan view of an alternative embodiment of the focusing element of the present invention.

FIG. 6 illustrates a plan view of one embodiment of the present invention wherein the reflectors 126 are cylindrical. FIG. 7 illustrates another embodiment of the invention wherein the reflectors 127 are octagonal. By varying the shape of the reflectors, the range of angles over which the brightness of an image will be enhanced can be altered. For example, when using cylindrical reflectors, the light source, the point of incidence on the reflector, and the viewing position must be substantially coplanar. When using other shapes, such as octagons or ellipsoids, parallel rays of light which are incident upon the surface may be reflected in many different directions. Although these shapes do not unidirectionally concentrate the light as intensely as the cylinder, the material will look bright over a wider range of angles due to the three dimensional curvature of the surfaces. By using ellipsoids, the angles of reflection can be controlled much like the cylinder, but a wider range of viewing angles can be realized. Although hexagonal concave reflectors (discussed below with respect to FIG. 19) are preferable, the invention is not limited to any particular shape of focusing element. Asymmetrical patterns of focusing elements can also be created which can provide greater control of the light while also reducing diffractive effects, as described below with respect to FIGS. 19 and 20. An example of asymmetrical focusing elements are the truncated conical reflectors 162 shown in FIG. 8.

Figure 8:
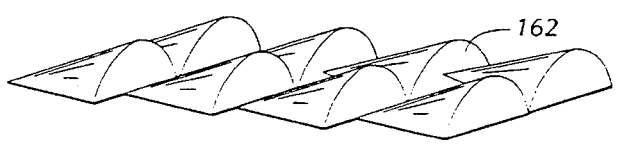
FIG. 8 illustrates an isometric view of an alternative embodiment of the focusing elements of the present invention.
Figure 9:
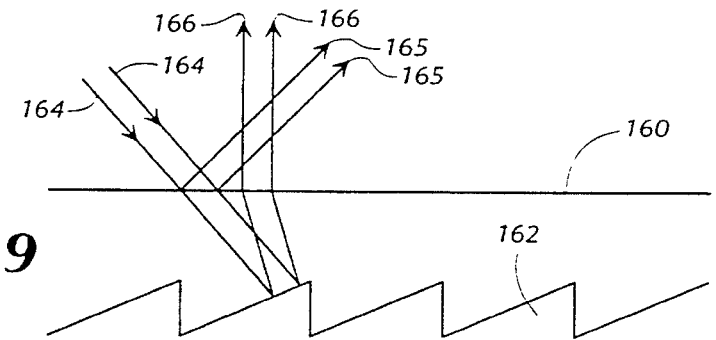
FIG. 9 illustrates a cross-sectional view of the light control material of the present invention incorporating the focusing elements shown in FIG. 8.

FIG. 9 illustrates a cross-sectional view of the light control material of the present invention incorporating the truncated conical reflectors of FIG. 8. As indicated by the light rays 166 reflected from reflectors 162, the field of view is almost normal to the surface 160 of the light control material. As stated above, by using asymmetrical focusing elements, a field of view can be provided which does not include the angles of specular reflection. This allows a brightness enhanced image to be viewed through a range of angles which contains no specular reflection. Rays 165 indicate specular reflection. When the light control material is viewed along rays 166, specular reflection (i.e., glare) will be avoided.

Figure 10A:
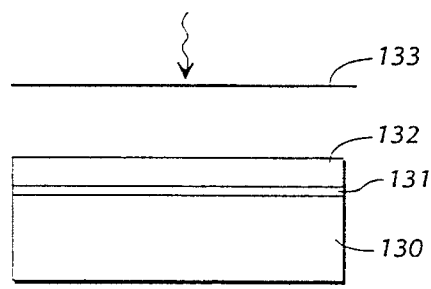
FIGS. 10a–10i illustrate the preferred method for fabricating an embodiment of the light control material of the present invention.

The preferred method for creating the light control material of the present invention will now be described with reference to FIGS. 10a through 10i. FIG. 10a illustrates a substrate 130, which is preferably glass or quartz, having a thin layer of metal 131 thereon, preferably chrome. The metal is preferably deposited onto the substrate by vapor deposition, although other well known techniques for depositing a metal layer may be used. The metal layer is then coated with a layer of photoresist 132 preferably by spin coating, although other known techniques for depositing a uniform layer of photoresist can also be used. The photoresist is masked with mask 133 and exposed to ultraviolet light. The photoresist is preferably Shipley 1300 series or Shipley 1800 series positive photoresist. Negative photoresist can also be used if desired, although positive photoresist is preferred. Although the photoresist is preferably exposed to ultraviolet light, other types of actinic radiation may also be used depending on the type of photoresist used. It is well known that different types of photoresist exist which exhibit photochemical effects in response to different wavelengths of light. In the case where positive photoresist is used, the opaque areas in the mask correspond to areas in the photoresist which will be retained, whereas the clear areas in the mask correspond to areas in the photoresist which will be removed.

Figure 10B:
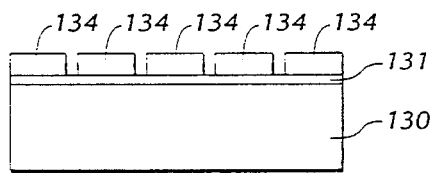
Figure 10C:
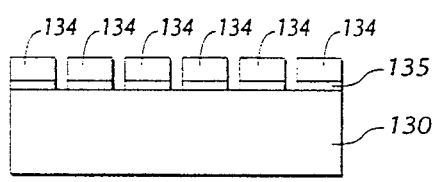

As shown in FIG. 10b, the areas which have been exposed are then developed away leaving pads of photoresist 134 on top of the metal layer 131. In FIG. 10c, an acid bath has been used to remove portions of the metal not protected by the photoresist pads 134. The remaining pads of metal 135 serve as an adhesion promoter between the photoresist 134 and the substrate 130. Although the metal pads are preferred, they are not critical to the fabrication method of the present invention, as discussed below in more detail.

Figure 10D:
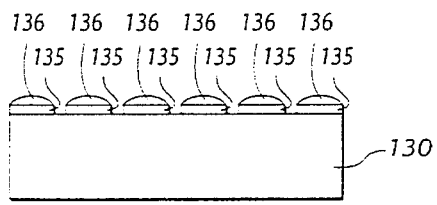

The next step, as illustrated in FIG. 10*d* is to heat the photoresist so that the photoresist flows (i.e., photoresist heat flowing), thereby creating domed shapes 136 on top of the chrome 135. The amount of photoresist initially applied will depend on the desired height of the domed shapes after heat flowing. The volume of the photoresist domes will be substantially equal to the volume of the photoresist pads. However, due to the loss of some of the photoresist during the heat flowing step, it may be desirable to insure that the photoresist pads are somewhat greater in volume than the desired volume of the domes. For example, when making cylindrical focusing elements, the photoresist pads should be approximately 10% greater in volume than the intended volume of the domes.

Figure 10E:
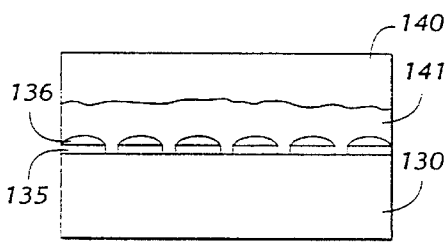

As illustrated in FIG. 10*e*, the photoresist is then covered with liquid photopolymer 141, and a glass plate 140 is placed in contact with the photopolymer 141. The photopolymer is then exposed to ultraviolet light which causes the photopolymer to harden, although other wavelengths of actinic radiation may be used depending on the type of photopolymer used. Norland Optical Adhesive #61 is a suitable photopolymer for this purpose. After the photopolymer is hardened, the structure comprising substrate 140 and hardened photopolymer 141 is separated from the mold which comprises substrate 130, chrome pads 135 and the photoresist dome shapes 136, and the photoresist is washed from the mold with a chemical wash. The resulting structure is then placed in contact with liquid photopolymer 142 which is placed in contact with a plastic substrate 143. The liquid photopolymer 142 is then exposed to ultraviolet light which causes the photopolymer to harden and bond to substrate 143. The structures are then separated and the resulting master, comprised of substrate 143 and convex focusing shapes 142, is coated with a layer of metal 145 which is preferably aluminum. Although the aluminum coating is not essential, providing a metal coating enhances the durability of the master and is therefore preferable.

Once the master has been created, embossments are preferably generated from the master by extrusion embossing. Extrusion embossing is a well known technique for generating embossments from a master. Therefore, a detailed discussion of extrusion embossing will not be provided. Generally, extrusion embossing utilizes a molten extrudate which is placed between and in contact with a master and with a substrate. The molten extrudate conforms to the shape of the master. When the molten extrudate is cooled, usually by use of a cooled embossing roll, the extrudate solidifies thereby taking on the shape of the master and bonding to the substrate.

Figure 10F:
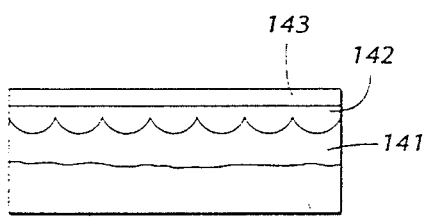
Figure 10G:
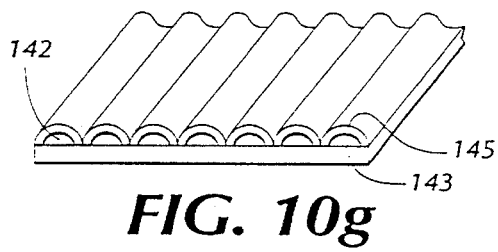
Figure 10H:
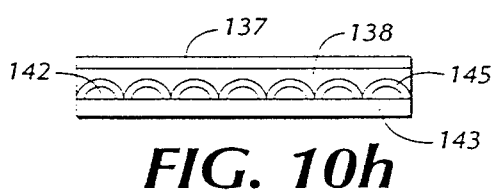
Figure 10I:
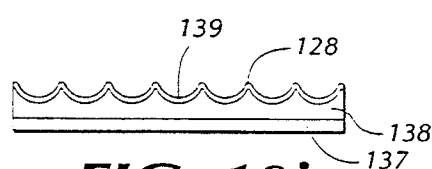

With reference to FIG. 10*h*, a transparent molten extrudate 138, preferably polypropylene, is placed in contact with the master. A substrate 137 is placed in contact with molten extrudate 138. The extrudate is then cooled until it solidifies. The embossment comprising dome-shaped convex focusing elements 139, solidified extrudate 138, and substrate 137 is then separated from the master as shown in FIG. 10*i*. Preferably, the focusing elements are then coated with a reflective layer of metal 128, which is preferably an aluminum layer deposited by, for example, vapor deposition. However, when the light control material is intended to operate in the transmissive mode, it is not coated with a reflective layer of metal.

Therefore, the method of the present invention provides for creating a master and for generating embossments therefrom. This is extremely advantageous in that light control materials do not have to be separately fabricated. Rather, one master is made by using photolithographic-type fabrication techniques and subsequent embossments can be generated from the master, thereby allowing structures comprising reflectors which are very small in size to be mass produced without having to resort to photolithographic-type techniques each time. Furthermore, by using the techniques of the present invention to create the master, the master can be made dimensionally perfect. This is a significant advantage over other techniques which may conceivably be used to create small focusing elements. For example, engine ruling utilizes a diamond tool having a very small radius which can be plowed back and forth through the surface of the material to create an array of lenses. However, this technique employs a mechanical system which actually deforms the surface of the material and which may impair its dimensional accuracy.

Although the method described above has been described in relation to fabricating cylindrical reflectors, the method may be used to fabricate focusing elements having virtually any geometry. The geometry of the focusing elements may be easily selected by selecting a mask which is appropriately designed with the opaque and clear areas necessary to create the desired shape of the focusing elements. The heat flowing step causes the photoresist to flow, which results in focusing elements which are curved in at least one dimension. Furthermore, the method allows convex or concave focusing elements to be created. For example, if convex focusing elements are desirable, the structure comprised of substrate 140 and hardened photopolymer 141 shown in FIG. 10*f* is used as the master and the structure shown in FIG. 10*g* is the resulting embossment. If the structure of FIG. 10*g* is the desired focusing element embossment, the photopolymer embossing step described above with respect to FIG. 10*f* is preferably used to generate the embossment. However, the extrusion embossing technique discussed with respect to FIG. 10*h* may also be used to produce the embossment. Also, if the light control material is intended to operate in the transmissive rather than in the reflective mode, the focusing elements are not coated with the reflective layer of metal 128 so that they remain transparent.

Variations of the methods discussed above can be used to create the master and embossments of the present invention. For example, the mold shown in FIG. 10*d* can be used to create a nickel master by first vapor depositing a thin layer of metal such as silver or nickel onto the mold and electroplating the mold with nickel in a nickel electroplating bath. The nickel master is then separated from the mold. Liquid photopolymer can then be placed in contact with the nickel master and exposed to ultraviolet light to produce an embossment having concave focusing elements, such as that shown in FIG. 10*g*. In all of the foregoing embodiments which use liquid photopolymer in the casting procedure, it is possible to use optical epoxy or silicone RTV instead of liquid photopolymer, although liquid photopolymer is preferred. The nickel master can also be directly used in the extrusion embossing procedure discussed with respect to FIGS. 10*h* and 10*i* to produce extrusion embossed polypropylene focusing elements. A second generation nickel master can be electroformed from the original nickel master which wil be a negative replica of the original nickel master. The original nickel master will produce convex focusing elements whereas the second generation master will produce concave focusing elements. The type of photopolymer selected is determined in view of the materials it will be placed in contact with. For example, when liquid photopolymer is placed in contact with the nickel master, a blend consisting of Ebercryl 3700 40% trymethylolpropane triacrylate 40%, isobornyl acrylate 17%, and CIBA-GEIGY Irgacure 184 3%. This blend cures by means of ultraviolet light. Other types of radiation cured material can also be used.

As mentioned above, chrome pads 135 are preferable because they act as an adhesion promoter between the substrate 130 and photoresist pads 134. However, they are not essential to the methods described above. The heat flowing step used to create the domed photoresist pads 136 will produce the desired results without the chrome pads if a suitable substrate 130 is selected which has the necessary adhesion properties. For example, the heat flowing step of FIG. 10d has produced the desired results without using chrome pads 135 when Pyrex glass was used as substrate 130.

Figure 11:
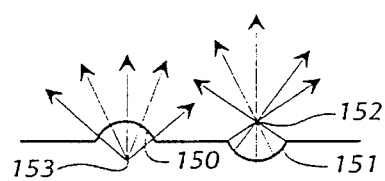
FIG. 11 illustrates optical properties of dome-shaped and dish-shaped focusing elements.

As illustrated in FIG. 11, the desired field of view can be obtained by using convex 150 or concave 151 focusing elements. Concave, reflective focusing elements are preferable, as will become apparent from the embodiments shown in FIGS. 13–17 and discussed below. The focal points 152 and 153 are located a distance equal to one half the radius of curvature from the surface of the focusing element.

Figure 12:
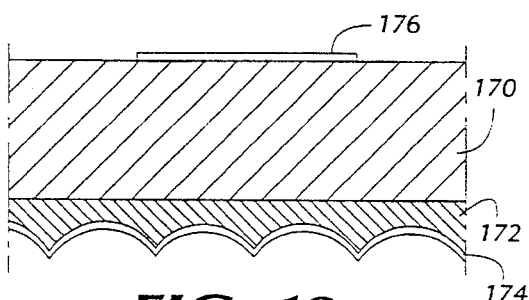
FIG. 12 illustrates a cross-sectional view of one embodiment of the light control material of the present invention.

In the embodiment shown in the cross-sectional view of FIG. 12, the light control material of the present invention comprises a transparent substrate 170 such as a plastic film which is bonded to an embossed layer of polymer 172, preferably polypropylene, having convex focusing elements formed therein and a thin layer of metal 174, preferably aluminum which covers the focusing elements. The aluminum is preferably deposited by vapor deposition. A print or photographic image 176 is supported on the surface of transparent substrate 170. The structure of FIG. 12 may also be printed on aluminum layer 174 if a suitable ink is used on the exposed side of aluminum layer 174. Preferably, ultraviolet curing inks are used for this purpose. Therefore, the structure can be printed on both sides if desired.

Figure 13:
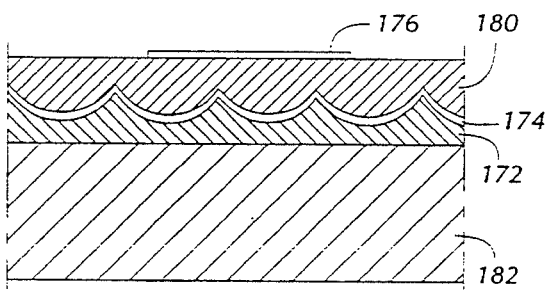
FIG. 13 illustrates a cross-sectional view of an alternative embodiment of the light control material of the present invention.

FIG. 13 illustrates a cross-sectional view of another embodiment of the present invention wherein the light control material comprises a substrate 182 which may be transparent or opaque, which is bonded to an embossed layer of polymer 172, preferably polypropylene, having concave focusing elements formed therein which are covered by a reflective layer of metal 174, and a transparent overcoat 180 which is conformed to reflective layer 174 and which has a printable surface. A print or photographic image 176 to be brightness enhanced is on the surface of the transparent substrate 180 which is a transparent overcoat. One type of material suitable for use as overcoat 180 is ICI NEOCRYL acrylic emulsion A-630.

If substrate 182 and embossed layer 172 are transparent, images can be carried on both sides of the light control material and they will be brightness enhanced by the focusing elements. If substrate 182 is opaque, it may be a plastic film such as TiO$_2$ filled polypropylene film, artificial paper, or a cellulose paper. If the substrate 182 is transparent, it may be one of many transparent plastic films such as polypropylene or polyester depending on the desired mechanical stability characteristics of the opaque substrate.

Figure 14:
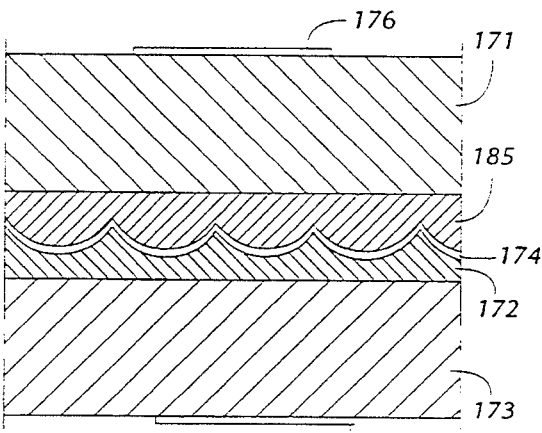
FIG. 14 illustrates a cross-sectional view of another alternative embodiment of the light control material of the present invention.

FIG. 14 illustrates a cross-sectional view of another alternative embodiment of the present invention wherein the light control material is illustrated as double sided and print or photographic images are shown being carried on both sides. This may be desirable where, for example, print or photographic images are to be carried on both sides of a page of a book or magazine. The light control material comprises transparent substrates 171 and 173 which are oriented polypropylene or polyester, an embossed layer of preferably polypropylene 172, which is typically extrusion embossed, having focusing elements formed therein, a reflective layer of metal 174 which is preferably aluminum for coating the focusing elements, and a transparent adhesive 185, which is preferably an extrusion lamination of polypropylene. Print or photographic images 176 and 184 are supported on the surfaces of substrates 171 and 173 and are brightness enhanced by the focusing elements.

Figure 15:
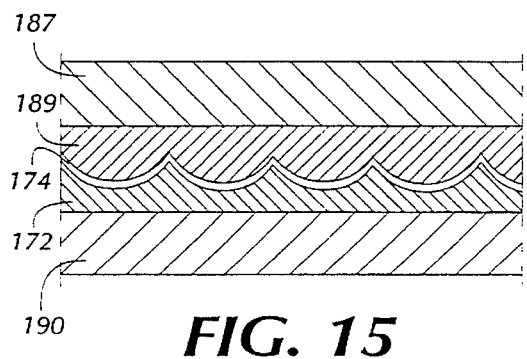
FIG. 15 illustrates a cross-sectional view of an alternative embodiment of the light control material of the present invention.

FIG. 15 illustrates a cross-sectional view of an alternative embodiment of the light control material of the present invention. The light control material comprises a substrate 190 such as paper, paper substitute, or film, depending on the intended application, an embossed layer of polymer 172, preferably polypropylene, having concave focusing elements formed therein, a reflective layer of metal 174 covering the focusing elements, and a transparent substrate which is a transparent conformal overcoat 189 and which is preferably of the same type described above with respect to FIG. 13 for overcoat 180. The overcoat 189 is preferably applied with a Gravure roller. The surface of overcoat 189 is covered with an emulsion 187, which is preferably a photographic print emulsion.

One of the advantages of the embodiment of FIG. 15 is the ease with which the light control material may be used with conventional photoprocessing techniques. Once the emulsion 187 has been applied to transparent substrate 189, a photograph can be produced by utilizing conventional exposure and developing techniques. The brightness of the photograph will be enhanced by the reflective focusing elements in accordance with the field of view provided by the focusing elements. Furthermore, if it is desirable to enhance the brightness of only selected portions of the photographic image, the pattern and/or geometry of the focusing elements may be varied such that certain portions of the image are made brighter than others. The ability to selectively enhance certain portions of a print or photographic image equally applies to all of the embodiments discussed with respect to FIGS. 12–17.

Figure 16:
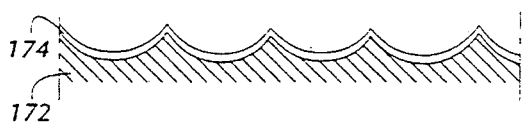
FIG. 16 illustrates a cross-sectional view of an alternative embodiment of the light control material of the present invention.

FIG. 16 illustrates an alternative embodiment of the light control material of the present invention wherein the light control material consists of an embossed polymer layer 172 having focusing elements formed therein and a reflective layer of metal 174 which is preferably aluminum. The embossed polymer layer is preferably an extrusion embossed layer of polypropylene. The structure is preferably used to carry a print or photographic image on either or both sides and to enhance the brightness thereof. However, the structure of FIG. 16 can be used to brightness enhance an image which is not in contact with the light control material. For example, the light control material of FIG. 15 can be used to brightness enhance a liquid crystal display wherein a minimum field of view can be provided which is independent of the angular extent of the light source. The contrast of the liquid crystal display can be enhanced over the field of view and specular reflection which constitutes glare can be avoided or overpowered, as discussed above.

Figure 17:
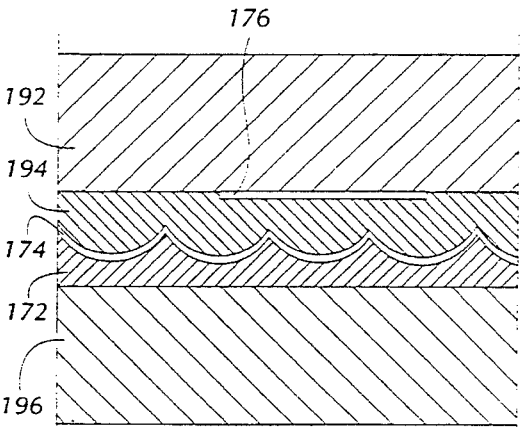
FIG. 17 illustrates a cross-sectional view of a preferred embodiment of the light control material of the present invention.

FIG. 17 illustrates a cross-sectional view of a preferred embodiment of the light control material of the present invention. The light control material comprises a transparent substrate 192, which is preferably oriented polypropylene, a transparent adhesive 194, preferably polypropylene, an embossed layer of focusing elements 172, which is preferably polypropylene, a reflective layer 174 covering the focusing elements, which is preferably aluminum, and a transparent substrate 196 which is typically a multi-layer material having heat seal properties and which may also contain an additional moisture barrier layer. For example, the multi-layer material may be comprised of polyethylene, nylon, and polypropylene. The nylon functions as a moisture barrier and the polyethylene acts as a heat seal. The print 176 is located between substrate 192 and adhesive 194. This embodiment represents the light control material of the present invention used in a typical packaging environment. A typical packaging structure normally has several layers of materials such as plastics and adhesives with the print embedded between the layers and a thin layer of metal which acts as an oxygen and moisture barrier. Therefore, this embodiment represents a cross-sectional view of a flexible film bag wherein the print 176 is brightness enhanced by the focusing elements. Reflective layer 172 serves the dual purpose of providing reflection and acting as an oxygen and moisture barrier.

In all of the embodiments shown in FIGS. 12–17, focusing elements which are concave or convex can be used if desired. Also, all of the embodiments provide structures which can carry a print or photographic image on either or both sides. If a printed image is desired, preferably transparent inks are used. If a photographic image is desired, preferably a print emulsion is used. Instant film is also suitable for use with the present invention. It should also be noted that FIGS. 12–17 illustrate only very small cross-sectional views of the light control material of the present invention merely for ease of illustration. This should be apparent in that each embodiment illustrates only one print dot or image element.

Generally, the distance between the focusing elements and the image being brightness enhanced (i.e., in most cases the thickness of the transparent substrate) will be substantially equal to or less than the size of the print dot or image element. This prevents light from the source which passes through one print dot or image element from being reflected by the focusing elements through a different print dot or image element. The requirement is not a strict one because, if it is not met, only slight variations in the actual color of the image will result at color boundaries which will likely be imperceptible to the human eye. Furthermore, this is only relevant where reflective focusing elements are being used.

Figure 18A:
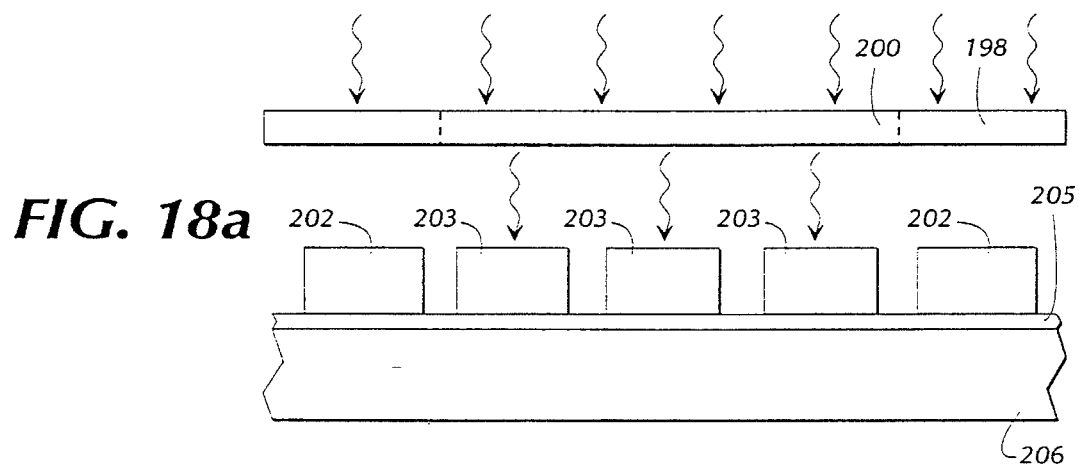
FIGS. 18a–18c illustrate steps which may be taken in creating the light control material of the present invention to enhance selected portions of an image more than others or to reduce diffractive effects.
Figure 18B:
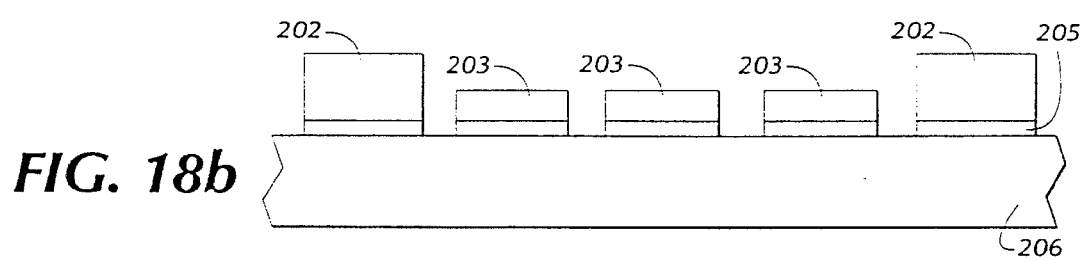
Figure 18C:
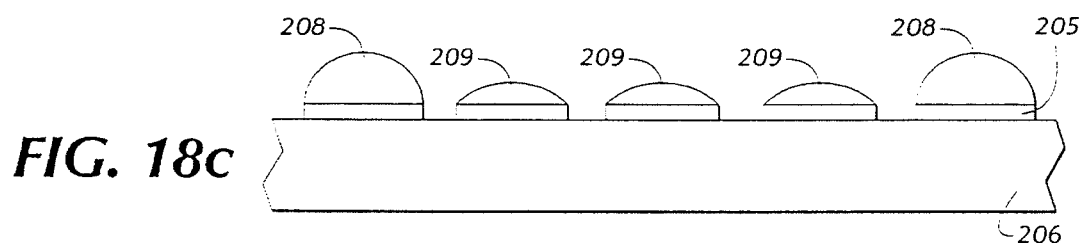

FIGS. 18a–18c correspond to the steps described above with respect to FIGS. 10a–10d with the exception that an additional step is implemented in FIG. 18a to uniformly expose photoresist pads 203 to an additional dose of ultraviolet light. Referring now to FIG. 18a, mask 198 is opaque everywhere except in the area indicated by the dashed lines and numeral 200. The area 200 corresponds to a clear area in mask 198. As shown in FIG. 18b, the additional exposure of photoresist pads 203 results in photoresist pads 203 being smaller in height than photoresist pads 202 after a second development. As indicated in FIG. 18b, the uncovered chrome layer 205 has been etched. This is accomplished through the use of an acid bath. FIG. 18c depicts the photoresist after the heat flowing step. The difference between the sizes of photoresist pads 202 and 203 results in domes of different sizes which consequently results in focusing elements which provide different fields of view. Domes 209 will provide a narrower field of view than domes 208. After the steps described above with respect to FIGS. 10a through 10i have been taken to complete the master and to generate an embossment therefrom, focusing elements which correspond to domes 209 will have a narrower field of view than focusing elements which correspond to domes 208. The narrower the field of view, the brighter the image over the field of view. The broader the field of view, the dimmer the image over that field of view in comparison to the brightness of the image over a narrower field of view. Therefore, by designing the light control material to have areas which provide different fields of view, selected portions of an image can be made brighter than others.

Although it is preferably to develop the photoresist pad 203 after the additional exposure steps, it is not absolutely necessary to do so. After the additional exposure step, the photoresist pads can be heat flowed (i.e., no additional development step is implemented) and the domed pads will still vary in size. This is most desirable for producing smaller differences in the resulting fields of view. Also, as discussed above, chrome pads 205 are not essential, although they are preferred.

Instead of varying the height of some of the photoresist pads by additional exposure to ultraviolet light, the mask 133 of FIG. 10a may be designed such that the opaque areas in the mask are of different sizes. This will result in photoresist pads of different widths. After heat flowing, the domes of photoresist will have differing radii and heights, i.e., the sag will differ from dome to dome. The difference in the radii and heights of the domes of the master (and consequently, of the embossment) will result in focusing elements with differing fields of view, as discussed above with respect to FIGS. 3 and 4.

Selected portions of an image may also be brightness enhanced more than others by varying the geometrical shapes of the focusing elements. This may be accomplished by varying the geometrical shape of the opaque areas in the mask. Furthermore, by varying the sizes or shapes of the focusing elements in the light control material, diffractive effects which are caused by periodicity in the pattern of focusing elements can be reduced.

The method for fabricating the master and embossments discussed above with respect to FIGS. 10a–10i is preferably also used to create asymmetric focusing elements such as the truncated cones shown in FIG. 8, with the exception that during the masking step shown in FIG. 10a, a known masking technique which utilizes a gray-scale mask is used to create the focusing elements and the chrome etching step of FIG. 10c and the heat flowing step of FIG. 10d are not used. By utilizing a gray-scale mask, the photoresist is exposed in some areas more than in others. When the exposed photoresist is developed, a dome-shaped, asymmetric focusing element pattern results.

Figure 19:
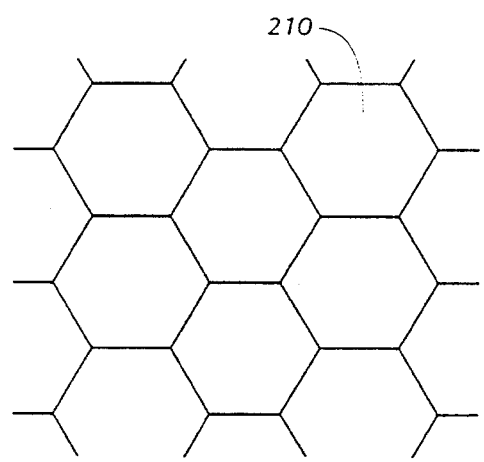
FIG. 19 illustrates a plan view of one embodiment of the focusing elements of the present invention wherein the pattern of the elements is symmetric.

FIG. 19 illustrates a plan view of one embodiment of the focusing elements of the present invention wherein the pattern of focusing elements is symmetric. The pattern of hexagons 210 is periodic over a distance of 60μ and is also symmetric about the symmetry of the hexagons. The symmetry and periodicity may result in a diffraction pattern which is strongly lobed in a hex star pattern. In order to reduce the diffraction effects, the periodicity of the pattern can be disrupted, as shown in FIG. 20.

Figure 20:
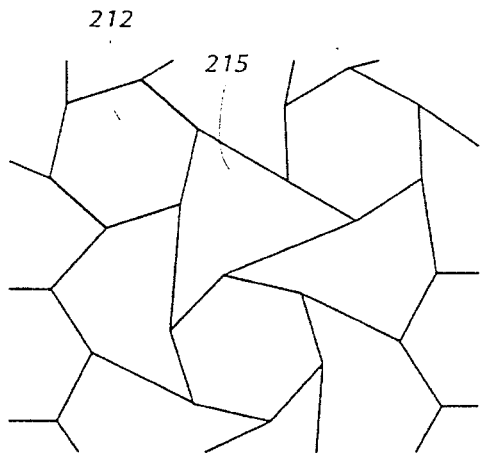
FIG. 20 illustrates a plan view of an alternative embodiment of the focusing elements of the present invention wherein the pattern of elements reduces diffractive effects.

FIG. 20 illustrates a plan view of an embodiment of the focusing elements of the present invention wherein the pattern of hexagons 212 has been disrupted by the presence of asymmetric focusing elements 215. The asymmetric focusing elements 215 provide a wider field of view than that provided by the hexagonal focusing elements 212. In addition to reducing diffractive effects, the wider field of view provided by the asymmetric focusing elements 215 provides for a gradual, as opposed to abrupt, change in the enhanced brightness of an image. Disrupting the periodicity of the focusing elements is also useful in eliminating moiré banding which may result when the ratio of the period of the focusing elements to the number of print dots remains constant. The periodicity of the focusing elements can also be disrupted by orienting the hexagons 212 in an asymmetric fashion with respect to each other, as shown in FIG. 20.

By varying the center-to-center distance between focusing elements of the same geometry and by varying the orientation of boundary lines of the shapes, the occurrence of parallel boundary lines is minimized. This minimizes constructive interference of light coming from the focusing elements which reduces diffractive effects.

The method discussed above with respect to FIGS. 10a–10i is also the preferred method for creating asymmetric focusing elements. The shapes of the opaque areas in mask 133 are designed to obtain the desired geometrically shaped photoresist pads 134 which, when heat flowed, take on the intended domed, or convex, geometrical shapes. The shape of the photoresist domes results in the asymmetric focusing elements being convex or concave, depending on whether the master used to generate the embossment has concave or convex focusing element shapes.

Asymmetric focusing elements can also be used to accomplish different objectives. For example, FIG. 8 illustrates a symmetric pattern of focusing elements created by using asymmetric conical focusing elements. Asymmetric reflectors allow greater control over the field of view than symmetrical reflectors. By providing a symmetrical pattern of asymmetrical reflectors, greater control over the field of view is obtained while providing a uniform field of view for enhancing the brightness of an image. However, diffractive effects may still occur if the center-to-center distance between focusing elements is constant. By creating an asymmetric pattern such as that shown in FIG. 20, diffractive effects can be reduced or eliminated, as discussed above. Although the pattern in FIG. 20 repeats on a periodic basis, the distance between repetitions is great enough with respect to the wavelengths of light provided by a light source to minimize diffractive effects. Furthermore, the pattern provides greater control over the field of view by providing a gradual change in the field of view, as discussed above.

While preferred embodiments of the present invention have been disclosed, it will be apparent to those skilled in the art that these illustrate only a few of many of the possible embodiments of the invention. For example, when the light control material is to be incorporated into a packaging structure, a less rigid transparent substrate is preferably used such as polypropylene. When the light control material is used in a non-packaging environment, it will be desirable to use a stiffer transparent substrate such as polyester, acrylic, or polycarbonate.

What is claimed:

1. A light control material for enhancing the brightness of a print or photographic image, said light control material comprising:
    a transparent substrate suitable for carrying the print or photographic image;
    a plurality of focusing elements formed in a polymer layer, said plurality of focusing elements having predetermined physical characteristics, wherein said polymer layer is bonded to said transparent substrate and wherein, said plurality of focusing elements control light impinging on said focusing elements in accordance with said physical characteristics such that a field of view is provided over which the brightness of the print or photographic image is enhanced.

2. A light control material for enhancing the brightness of a print or photographic image according to claim 1 wherein said focusing elements are coated with a reflective layer of metal and wherein said light control material operates in a reflective mode.

3. A light control material for enhancing the brightness of a print or photographic image according to claim 1 wherein said focusing elements are transparent and wherein said light control material operates in a transmissive mode.

4. A light control material for enhancing the brightness of a print or photographic image according to claim 1 wherein said physical characteristics include radius, width, and degree of symmetry.

5. A light control material for enhancing the brightness of a print or photographic image according to claim 1 wherein said focusing elements are symmetric in shape.

6. A light control material for enhancing the brightness of a print or photographic image according to claim 1 wherein said focusing elements are asymmetric in shape.

7. A light control material for enhancing the brightness of a print or photographic image according to claim 2 wherein the focusing elements are concave with respect to the print or photographic image.

8. A light control material for enhancing the brightness of a print or photographic image according to claim 2 wherein said focusing elements are convex with respect to the print or photographic image.

9. A light control material for enhancing the brightness of a print or photographic image according to claim 3 wherein said focusing elements are concave with respect to the print or photographic image.

10. A light control material for enhancing the brightness of a print or photographic image according to claim 3 wherein said focusing elements are convex with respect to the print or photographic image.

11. A light control material for enhancing the brightness of a print or photographic image according to claim 1 wherein the image can be viewed over the field of view from angles which avoid angles of specular reflection from said transparent substrate.

12. A light control material for enhancing the brightness of a print or photographic image according to claim 11 wherein the field of view does not include the angles of specular reflection.

13. A light control material for enhancing the brightness of a print or photographic image according to claim 11 wherein the field of view includes at least some of the angles of specular reflection.

14. A light control material for enhancing the brightness of a print or photographic image according to claim 11 wherein the enhanced brightness of the image is much greater than the specular reflection such that glare is reduced.

15. A light control material for enhancing the brightness of a print or photographic image according to claim 1 wherein said light control material further comprises at least one focusing element formed in said polymer layer in addition to said plurality of focusing elements and wherein said at least one focusing element has physical characteristics which are different from the physical characteristics of said plurality of focusing elements and wherein said at least one focusing element controls light impinging thereon in accordance with the physical characteristics of said at least one focusing element to provide a field of view which is different from the field of view provided by said plurality of focusing elements.

16. A light control material for enhancing the brightness of a print or photographic image according to claim 15 wherein said at least one focusing element is asymmetric in shape and wherein said plurality of focusing elements are symmetric in shape and wherein said at least one focusing element and said plurality of focusing elements provide a focusing element pattern which reduces diffractive effects.

17. A light control material for enhancing the brightness of a print or photographic image according to claim 16 wherein the different fields of view provide a gradual change in said brightness of said image.

18. A light control material for enhancing the brightness of a print or photographic image according to claim 15 wherein the brightness of the image is enhanced over the different fields of view and wherein the image can be viewed over the fields of view from angles which avoid angles of specular reflection from said transparent substrate.

19. A light control material for enhancing the brightness of a print or photographic image according to claim 18 wherein the fields of view do not include the angles of specular reflection.

20. A light control material for enhancing the brightness of a print or photographic image according to claim 18 wherein at least one of said fields of view include at least some of the angles of specular reflection.

21. A light control material for enhancing the brightness of a print or photographic image according to claim 18 wherein the enhanced brightness of the image over the fields of view is much greater than the specular reflection such that glare is reduced.

22. A light control material, for enhancing the brightness of a print or photographic image according to claim 15 wherein said at least one focusing element and said plurality of focusing elements are symmetric in shape and wherein the image is brightness enhanced to different degrees over the different fields of view and wherein the physical characteristics of the focusing elements determine the brightness of the image over the fields of view.

23. A light control material for enhancing the brightness of an image, said light control material comprising:

a plurality of focusing elements formed in a polymer layer, said plurality of focusing elements having predetermined physical characteristics, and a reflective layer of metal covering said focusing elements thereby making said focusing elements reflective, wherein said plurality of focusing elements control light impinging on said focusing elements in accordance with said physical characteristics to provide a field of view over which the brightness of said image is enhanced.

24. A light control material for enhancing the brightness of an image according to claim 23 wherein said physical characteristics include radius, width, and degree of symmetry.

25. A light control material for enhancing the brightness of an image according to claim 23 wherein said focusing elements are symmetric in shape.

26. A light control material for enhancing the brightness of an image according to claim 23 wherein said focusing elements are asymmetric in shape.

27. A light control material for enhancing the brightness of an image according to claim 23 wherein the focusing elements are convex in shape with respect to the print or photographic image.

28. A light control material for enhancing the brightness of an image according to claim 23 wherein the focusing elements are concave in shape with respect to the print or photographic image.

29. A light control material for enhancing the brightness of an image according to claim 23 wherein said light control material further comprises at least one focusing element formed in said polymer layer in addition to said plurality of focusing elements and wherein said at least one focusing element has physical characteristics which are different from the physical characteristics of said plurality of focusing elements and wherein said at least one focusing element controls light impinging thereon in accordance with the physical characteristics of said at least one focusing element to provide a field of view which is different from the field of view provided by said plurality of focusing elements.

30. A light control material for enhancing the brightness of an image according to claim 29 wherein said at least one focusing element is asymmetric in shape and wherein said plurality of focusing elements are symmetric in shape and wherein said at least one focusing element and said plurality of focusing elements provide a focusing element pattern which reduces diffractive effects.

31. A light control material for enhancing the brightness of an image according to claim 30 wherein the different fields of view provide a gradual change in said brightness of said image.

* * * * *